(12) United States Patent
De Mers et al.

(10) Patent No.: US 9,121,487 B2
(45) Date of Patent: Sep. 1, 2015

(54) PILOT INTERFACE FOR AIRCRAFT ELECTRIC TAXI SYSTEM

(71) Applicant: HONEYWELL INTERNATIONAL, INC., Morristown, NJ (US)

(72) Inventors: Robert E. De Mers, Nowthen, MN (US); Olukayode Olofinboba, Eden Prairie, MN (US); Keith Hughes, Peoria, AZ (US); Joseph Ott, St. Louis Park, MN (US); Alan Griesbach, Standish, ME (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 63 days.

(21) Appl. No.: 14/079,445

(22) Filed: Nov. 13, 2013

(65) Prior Publication Data

US 2015/0134149 A1    May 14, 2015

(51) Int. Cl.
*F16H 59/02* (2006.01)
*F16H 61/02* (2006.01)

(52) U.S. Cl.
CPC ............ *F16H 59/02* (2013.01); *F16H 61/0202* (2013.01)

(58) Field of Classification Search
CPC .............................. F16H 59/02; F16H 61/0202
USPC .......................... 701/3, 120, 121; 244/50, 234
See application file for complete search history.

(56) References Cited

U.S. PATENT DOCUMENTS

| | | | | |
|---|---|---|---|---|
| 5,029,778 | A * | 7/1991 | DeLuca | 244/234 |
| 5,039,037 | A * | 8/1991 | DeLuca | 244/234 |
| 2004/0040779 | A1 * | 3/2004 | Bishop | 180/443 |
| 2006/0065779 | A1 | 3/2006 | McCoskey et al. | |
| 2009/0261197 | A1 * | 10/2009 | Cox et al. | 244/50 |
| 2009/0266940 | A1 * | 10/2009 | Miller et al. | 244/223 |
| 2010/0276535 | A1 | 11/2010 | Charuel et al. | |
| 2013/0200209 | A1 * | 8/2013 | Goldman et al. | 244/50 |
| 2014/0114557 | A1 * | 4/2014 | Nutaro et al. | 701/121 |
| 2015/0021431 | A1 * | 1/2015 | Kracht et al. | 244/50 |

FOREIGN PATENT DOCUMENTS

| | | |
|---|---|---|
| EP | 2468626 A2 | 6/2012 |
| WO | WO2008150313 A2 | 12/2008 |

OTHER PUBLICATIONS

"Joint demonstration of new electric taxi system installed in a main landing gear", Lufthansa Technik, Dec. 8, 2011 (2 pages).

* cited by examiner

*Primary Examiner* — Fadey Jabr
*Assistant Examiner* — Yazan A Soofi
(74) *Attorney, Agent, or Firm* — Shimokaji IP

(57) ABSTRACT

A pilot interface panel may comprise at least one input mechanism configured to receive at least one user input, generate at least one input signal corresponding to the at least one user input, and send the at least one input signal to a controller. The controller may be configured to control movement of an electric taxi system of an aircraft in a manner according to the at least one input signal, wherein the electric taxi system may be configured to rotate at least one wheel of the aircraft by force from a purely electromotive source. The pilot interface panel may further comprise at least one safety mechanism, which may be configured to prevent at least one of the at least one input mechanisms from receiving an inadvertent user input resulting from an unintended action by the user.

20 Claims, 15 Drawing Sheets

PILOT INTERFACE FOR AIRCRAFT ELECTRIC TAXI SYSTEM

BACKGROUND OF THE INVENTION

The present invention generally relates to a cockpit interface system for controlling an aircraft electric taxi system.

Taxi systems are being developed for use on aircraft so that planes may be maneuvered on the ground without running the main engine. Instead, electric motors directly drive one or more of the landing gear wheels. In order for the electric taxi system to perform its function properly, a pilot interface must be provided to allow the pilot to direct the taxiing of the plane.

Currently, methods of allowing pilots to control the electric taxi system generally employ a joystick interface. Pilots can move the joystick forward, backward, left, and right in order to move the plane accordingly. Joysticks control movement via user inputs related to thrust or acceleration, rather than a particular desired speed. In addition, this type of interface allows the user to move the joystick, and thus the aircraft, with little to no resistance or other form of mechanical safety check. Also, turn motions may be performed along with directional movement, although tight-turn and/or pivot motions may be unavailable.

However, pilots often prefer to control ground movement of an aircraft via inputting a target speed, and are also concerned about having safety checks in the context of initiating various types of ground movement. It may also sometimes be necessary to pivot an aircraft without moving the aircraft in a forward or backward direction. Thus, there is a need for an intuitive cockpit interface system that allows the pilot to control the aircraft's motion easily and safely, incorporating elements to prevent inadvertent activation of motion, especially for pivot or reverse maneuvers which have the potential to damage the aircraft.

SUMMARY OF THE INVENTION

In one aspect of the present invention, a pilot interface panel comprises at least one input mechanism configured to receive at least one user input, generate at least one input signal corresponding to the at least one user input, and send the at least one input signal to a controller, the controller configured to control movement of an electric taxi system of an aircraft in a manner according to the at least one input signal, and the electric taxi system configured to rotate at least one wheel of the aircraft by force from a purely electromotive source; and at least one safety mechanism configured to prevent at least one of the at least one input mechanisms from receiving an inadvertent user input resulting from an unintended action by the user.

In another aspect of the invention, an aircraft taxi interface system comprises a pilot interface panel configured to receive at least one user input, generate at least one input signal corresponding to the at least one user input, and provide a safety mechanism configured to prevent at least one of the at least one input mechanisms from receiving an inadvertent user input resulting from an unintended action by the user; and a controller in communication with the pilot interface panel and a motor control unit, the motor control unit configured to control at least one motor of an electric taxi system of an aircraft, the electric taxi system configured to rotate at least one wheel of the aircraft by force from a purely electromotive source, the controller being operable to receive the at least one input signal from the pilot interface panel, determine an action for the electric taxi system based on the at least one input signal, generate a command corresponding to the action, and send the command to the motor control unit, wherein the motor control unit initiates the action in the electric taxi system.

In a further aspect of the invention, an aircraft taxi interface method for controlling an electric taxi system of an aircraft, comprises providing at a pilot interface panel at least one input mechanism and a safety mechanism, the safety mechanism configured to prevent at least one of the at least one input mechanisms from receiving an inadvertent user input resulting from an unintended action by the user; receiving at least one user input via the at least one input mechanism; generating at least one input signal corresponding to the at least one user input; and sending the at least one input signal to a controller, the controller configured to control movement of an electric taxi system of an aircraft in a manner according to the at least one input signal, and the electric taxi system configured to rotate at least one wheel of the aircraft by force from a purely electromotive source.

These and other features, aspects and advantages of the present invention will become better understood with reference to the following drawings, description and claims.

DETAILED DESCRIPTION OF THE INVENTION

Figure 1:
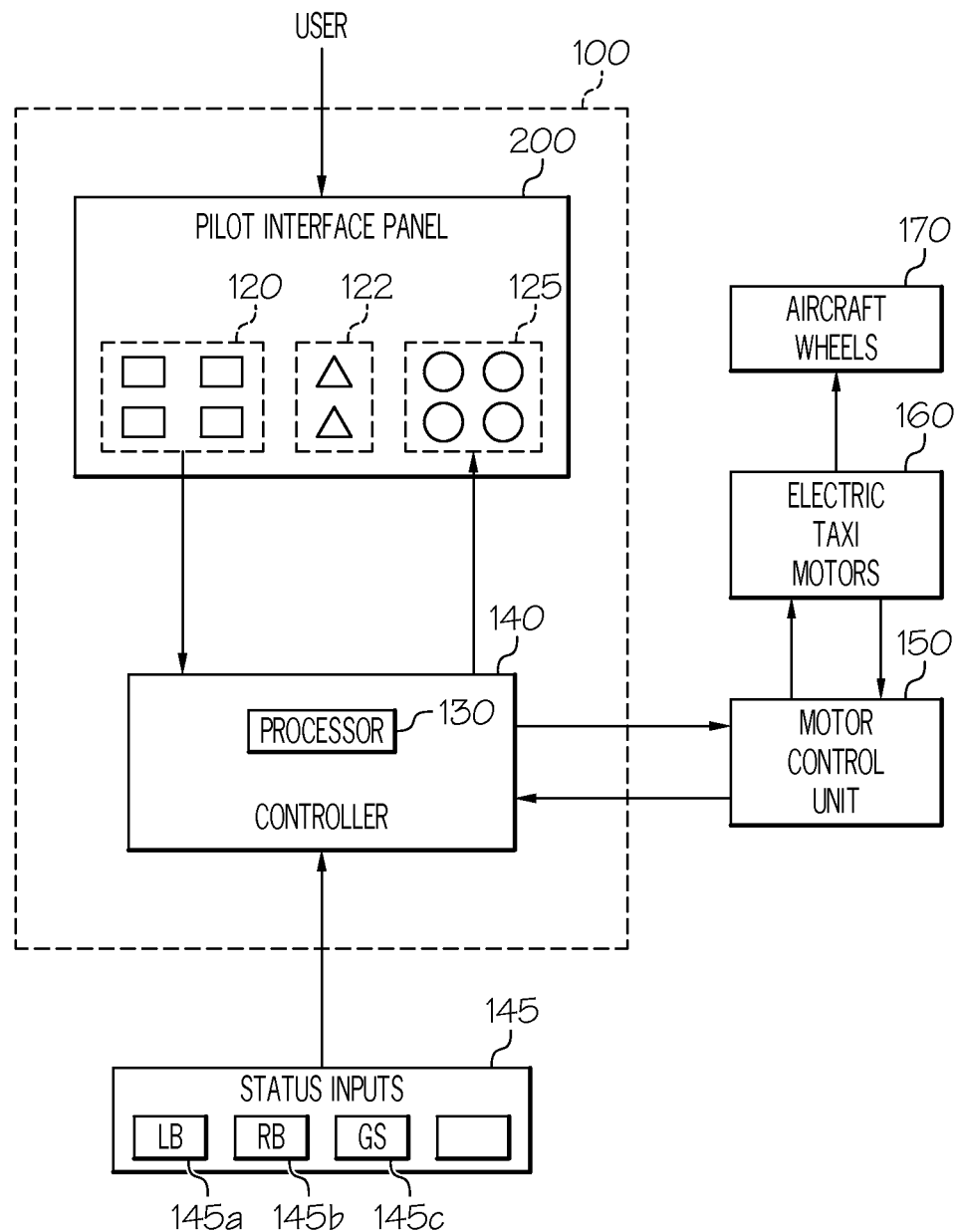
FIG. 1 illustrates an aircraft electric taxi interface system according to an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, an embodiment of the present invention generally provides a pilot interface panel and system to allow for the intuitive and safe control of an aircraft's ground movement via an electric taxi system, which may rotate the aircraft wheels using purely electromotive force. The pilot interface panel may be installed in the cockpit of the aircraft so that the pilot may enter various requests for the taxi system, such as a target speed, the direction of motion, and other commands. The ability to enter a target speed may offer the pilot greater security in controlling the aircraft ground speed, than using a joystick to request acceleration alone. The panel may also include various safety features to prevent inadvertent requests for motion. This may be of importance to a pilot, who may wish to focus on quickly and accurately performing duties in the cockpit as opposed to worrying about accidentally bumping, switching or pushing an input mechanism and thereby unintentionally moving the aircraft in one direction or another. Certain inadvertent activations of motion may also have the potential to damage the aircraft. Further, feedback lights may also be included in the panel to communicate various system statuses to cockpit operators. These status lights may provide the pilot with information based on which the pilot may choose to perform various operations.

The interface panel may communicate the user's entries to a system controller, the logic of which may require a combination of various inputs to ensure that an action was intended by the user. The controller may then communicate with a motor control unit to control the motors for ground movement. Communication may also occur from the motor control unit and other components of the system to the controller.

The pilot interface panel may comprise at least one input mechanism configured to receive at least one user input, generate at least one input signal corresponding to the at least one user input, and send the at least one input signal to a controller. The controller may be configured to control movement of an electric taxi system of an aircraft in a manner according to the at least one input signal, wherein the electric taxi system may be configured to rotate at least one wheel of the aircraft by force from a purely electromotive source. The pilot interface panel may further comprise at least one safety mechanism, which may be configured to prevent at least one of the at least one input mechanisms from receiving an inadvertent user input resulting from an unintended action by the user.

The at least one input mechanism may include an engagement mechanism configured to receive an engagement input and generate a corresponding engagement input signal indicating a request to activate a clutch engagement sequence for the electric taxi system.

The at least one input mechanism may also include a speed input mechanism configured to receive a speed input for a target taxi speed and generate a corresponding speed input signal indicating a request to reach the target taxi speed. The speed input mechanism may include a control lever and the at least one safety mechanism may include at least one detent configured to provide resistance to movement of the control lever. The speed input mechanism may also include a resume switch configured to receive a resume input and generate a corresponding resume input signal indicating a request to resume the target taxi speed.

The at least one input mechanism may include a reverse input mechanism configured to receive a reverse input and generate a corresponding reverse input signal indicating a request to move in a reverse motion. The at least one safety mechanism may include a reverse lockout member configured to prevent the reverse input mechanism from receiving an inadvertent user input, the reverse lockout member being maneuverable to allow the reverse input mechanism to receive a reverse input.

The at least one input mechanism may further include a pivot input mechanism configured to receive a pivot input and generate a corresponding pivot input signal indicating a direction for pivoting. The pivot input mechanism may default to a neutral position and generate a signal indicating no pivot desired. The at least one safety mechanism may include a switch guard configured to prevent the pivot input mechanism from receiving an inadvertent user input.

The pilot interface panel may further comprise a plurality of response mechanisms configured to communicate various system states to the user.

FIG. 1 shows an embodiment of the present invention in the context of an aircraft electric taxi system. An aircraft taxi interface system 100 may include a pilot interface panel 200 and a controller 140. Pilot interface panel 200 may include input mechanisms 120 which may receive user inputs and communicate the inputs via signals to a controller 140. Pilot interface panel 200 may also include safety mechanisms 122 configured to prevent unsafe user inputs or aircraft maneuvers. Safety mechanisms 122 may optionally communicate signals indicating safety statuses to controller 140. Input mechanisms 120 and safety mechanisms 122 may send signals directly to controller 140. Alternatively, pilot interface panel 200 may include a processor (not shown) that may receive signals directly from input mechanisms 120 and safety mechanisms 122, and then send corresponding signals to controller 140.

Controller 140 may include a processor 130, and may be programmed according to the requirements of a particular aircraft or preferences of a user. Additionally, controller 140 may receive one or more status inputs 145 independently of pilot interface panel 200. Controller 140 may receive incoming signals, for example, via processor 130. Controller 140 may, via processor 130 for example, determine an action based on one or more received signals, which may include but are not limited to input signals, safety status signals, or status inputs. Controller 140 may then send a command to carry out the user-requested action to motor control unit 150, which may be responsible for controlling electric taxi motors 160, such as wheel actuators. Electric taxi motors 160 may be connected to aircraft wheels 170, which may be activated and rotated with electromotive force alone. Response signals indicating various system statuses may also be communicated from controller 140, via processor 130 for example, to pilot interface panel 200, and then communicated to the user via response mechanisms 125. Response mechanisms 125 may receive signals directly from controller 140 or other system components. Alternatively, pilot interface panel 200 may include a processor (not shown) that may receive signals being sent to pilot interface panel 200 and then communicate corresponding signals to response mechanisms 125.

Figure 2A:
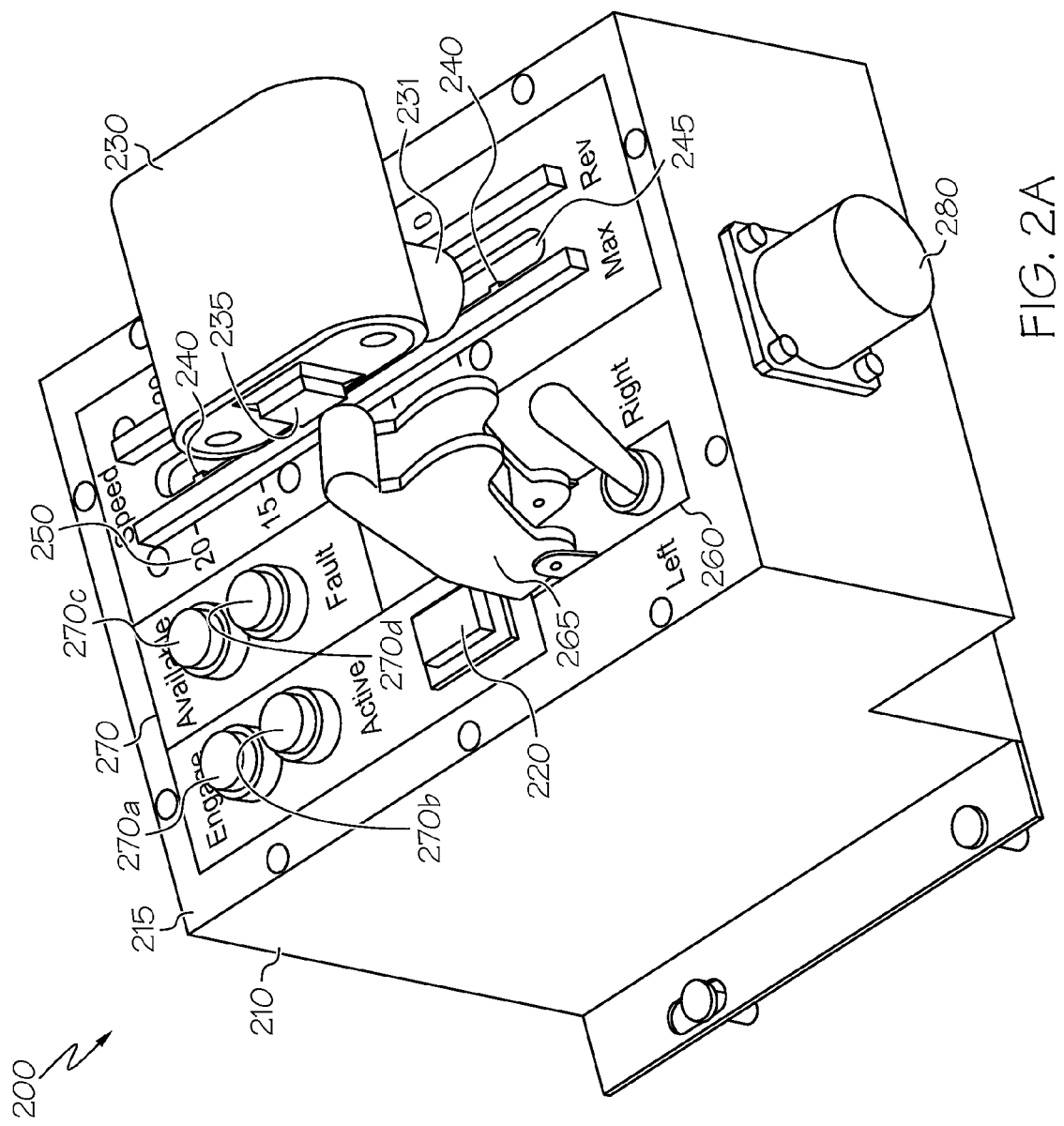
FIG. 2A illustrates a perspective front view of a pilot interface panel according to an exemplary embodiment of the present invention.

Referring to FIGS. 1 and 2A, an embodiment of a pilot interface panel 200 is illustrated. Included with the main body 210 are various input and output mechanisms, along with safety elements. The input mechanisms 120 (see FIG. 1) may include elements 220, 230, 235, 260, 290, and 295 of FIG. 2A, and may be configured to receive inputs from a user via a press, pull, push, lift, turn, or other various input forms. Upon receipt of a user input, an input mechanism may generate an input signal corresponding to the input. The input mechanism may send the input signal to controller 140. Alternatively, the input signal may be sent to a processor (not shown) within pilot interface panel 200, which may then send a secondary signal in accordance with the input signal to a controller 140. The controller 140 may be in communication with pilot interface panel 200 via one of various wired or wireless connection forms, such as via connection interface 280. The controller 140 may receive input signals from one or more input mechanisms simultaneously or in sequence. The controller 140 may be responsible for determining an action for the electric taxi system based on the one or more input signals received, generating a command corresponding to that action, and sending the command to motor control unit 150 which then controls one or more motors 160 of the aircraft's electric taxi system to perform the action.

Engagement switch 220 when pressed may send an engagement signal to controller 140, indicating a request to activate a clutch engagement sequence of the electric taxi system. Controller 140 then may determine that the appropriate action based on this signal is to activate a clutch engagement sequence, and it may generate and send a corresponding command to the motor control unit 150 to perform the action in the electric taxi system. Engagement switch 220 may employ a momentary mechanism, or various other mechanisms.

Speed control lever 230 allows the pilot to set a target speed for the ground taxi movement of the aircraft. For example, if the speed control lever 230 is pushed from the "0" indicator to the "10" indicator marked on speed level indicator 250, the controller 140 may receive a signal indicating a request to accelerate the electric taxi motors 160 until the aircraft is moving at, for example, 10 knots. If the speed control lever 230 is then pulled from the "10" indicator to the "5" indicator, the controller 140 may be signaled to decelerate the motors 160 until the aircraft is moving at 5 knots. The speed level indicator 250 may show speeds from a maximum reverse speed to a maximum forward speed. The maximum speeds may be preset to a reasonably safe speed for ground taxiing of an aircraft (not shown), with the maximum reverse speed being significantly lower than the maximum forward speed as an additional precaution against, for example, moving the aircraft in a backward direction too quickly and possibly resulting in a collision with an unseen object behind the aircraft.

Safety mechanisms 122 may include detents 240 formed as projections along lever channel 245. Alternatively, or in addition, detents 241 (see FIGS. 3A-3C) may be formed as notches upon ridges 246 to the left and right of lever channel 245. As a safety measure, detents 240 and/or 241 may be provided along the path for movement of the speed control lever 230, and may require the user to exert significant force in order to move the lever 230 so as to prevent the user from accidentally moving the lever 230, thus causing the aircraft to move at a higher or lower speed than desired. In addition or as an alternative, lever lock 232 shown in FIG. 2B may serve as one of safety mechanisms 122, requiring the user to pull the speed control lever 230 in an upwards motion in order to release the lever 230 forward or backward to change speeds.

In many cases, the determination of a single action may be based on a combination of multiple input signals. For example, resume switch 235 may be disposed at the side of the handle of speed control lever 230. Resume switch 235 may be a momentary switch that, when depressed, provides a signal to resume speed after braking has been applied. Upon the brakes (not shown) being engaged, the controller 140 may receive a brake status input 145a/145b (see FIG. 1) and send a command signal to the motor control unit 150 to apply zero torque to the drive motor. When the pilot wishes to reactivate the taxiing, he may press the resume switch 235, upon which the controller 140 may send a signal to the motor control unit 150 to provide torque according to the speed signal indicated by the position of the speed control lever 230.

As an additional or alternative safety measure, the controller 140 may be programmed with a "dead lever" configuration, such that a pilot may adjust the target speed using the control lever 230, but the system may not begin reaching that new speed until the resume switch 235 is pressed and the controller 140 receives a resume input. Alternatively, the controller 140 may be programmed with a "live lever" configuration, where movement of the control lever 230 may immediately initiate a change in the taxi speed towards the new target speed, without the need for the resume switch 235 to be pressed. Either configuration may apply to forward or reverse motions.

As an alternative to the speed control lever 230, one of various forms of a speed control mechanism, including but not limited to a switch with a speed counter, keypad, or dial, may be employed.

Figure 6:
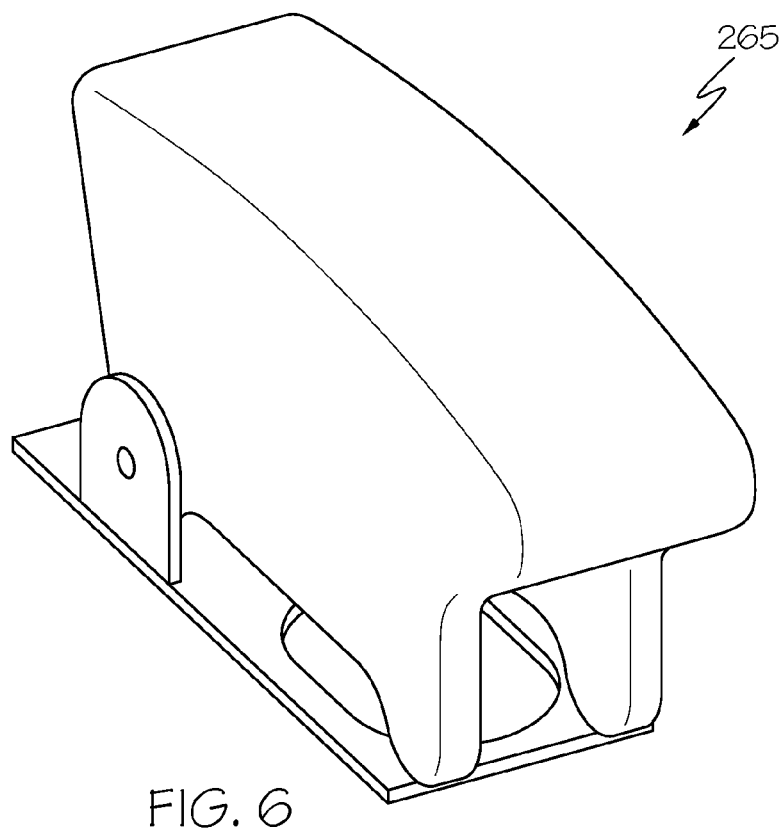
FIG. 6 illustrates a close-up view of a switch guard of the pilot interface panels of FIGS. 2A and 3A.
Figure 7A:
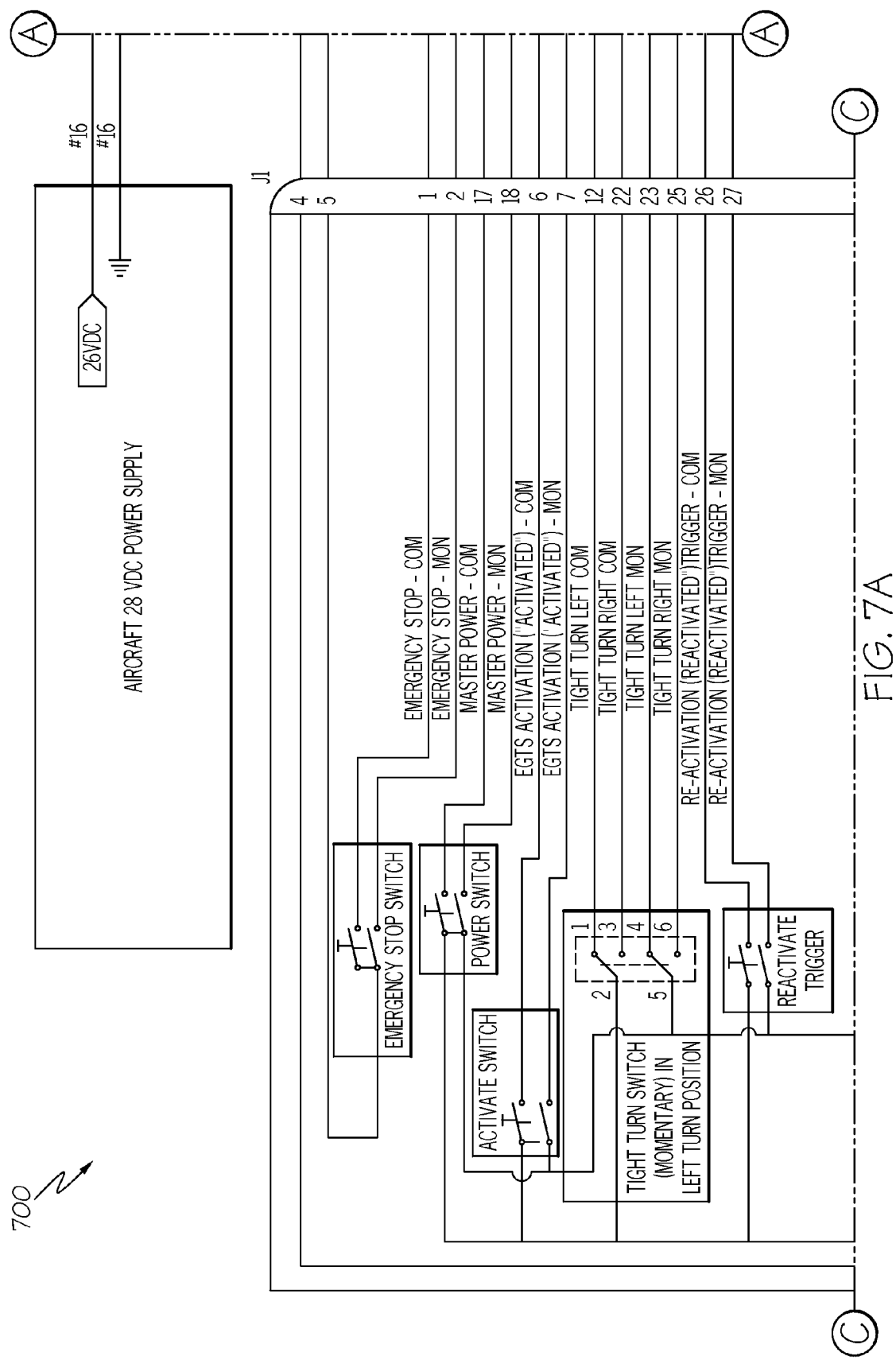
FIGS. 7A-7D illustrates a wiring diagram for a pilot interface panel according to an exemplary embodiment of the present invention.
Figure 7B:
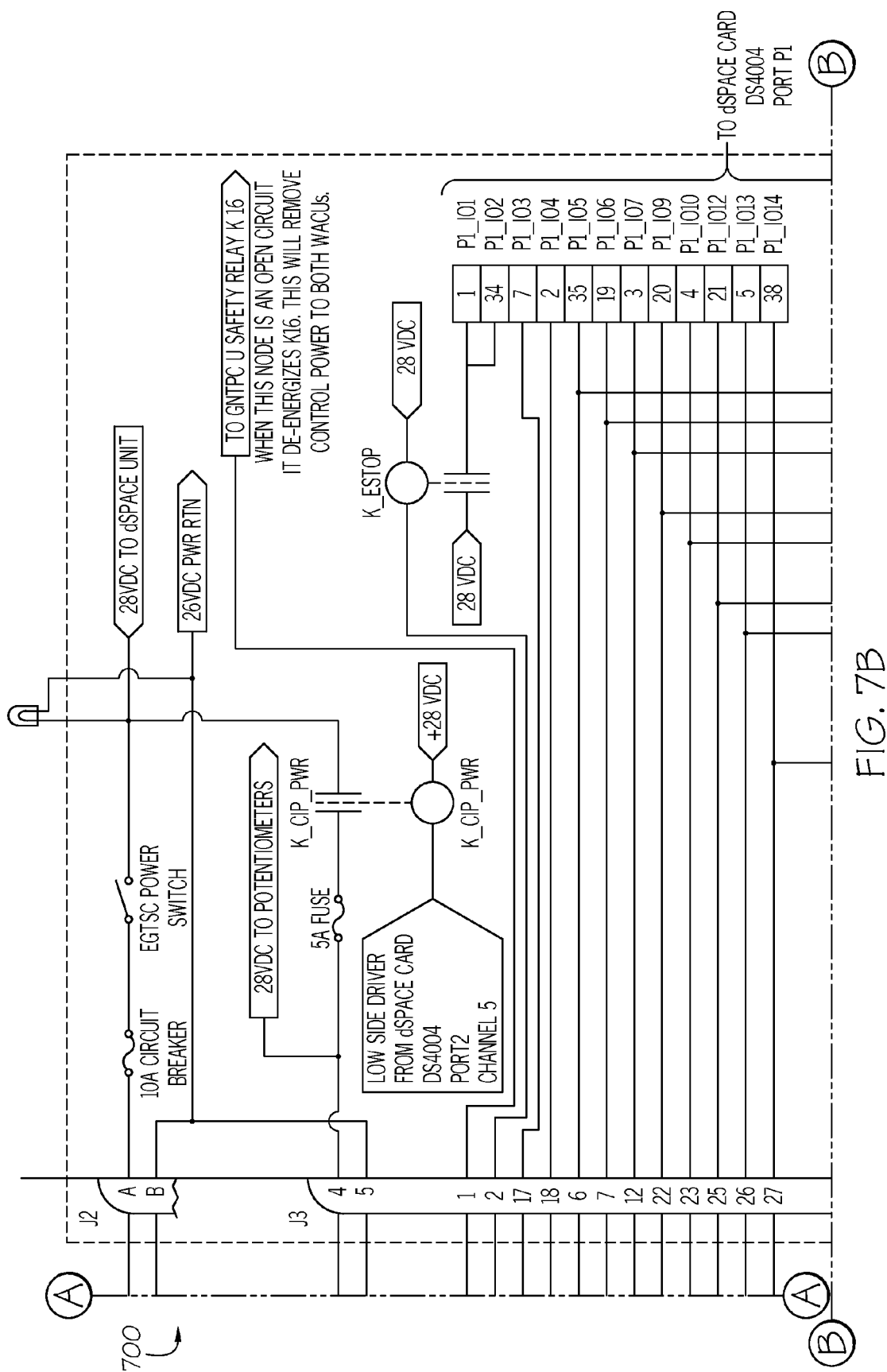
Figure 7C:
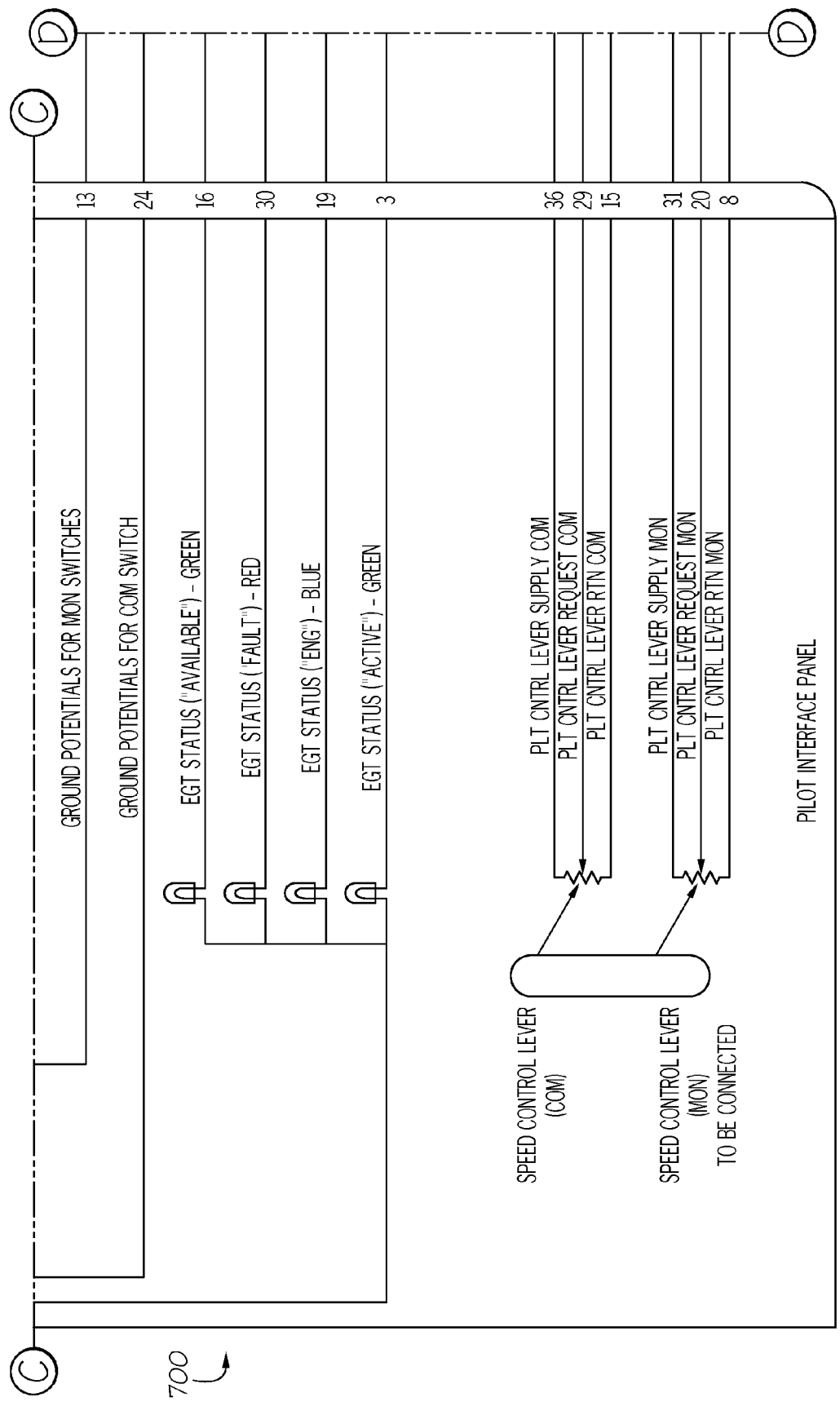
Figure 7D:
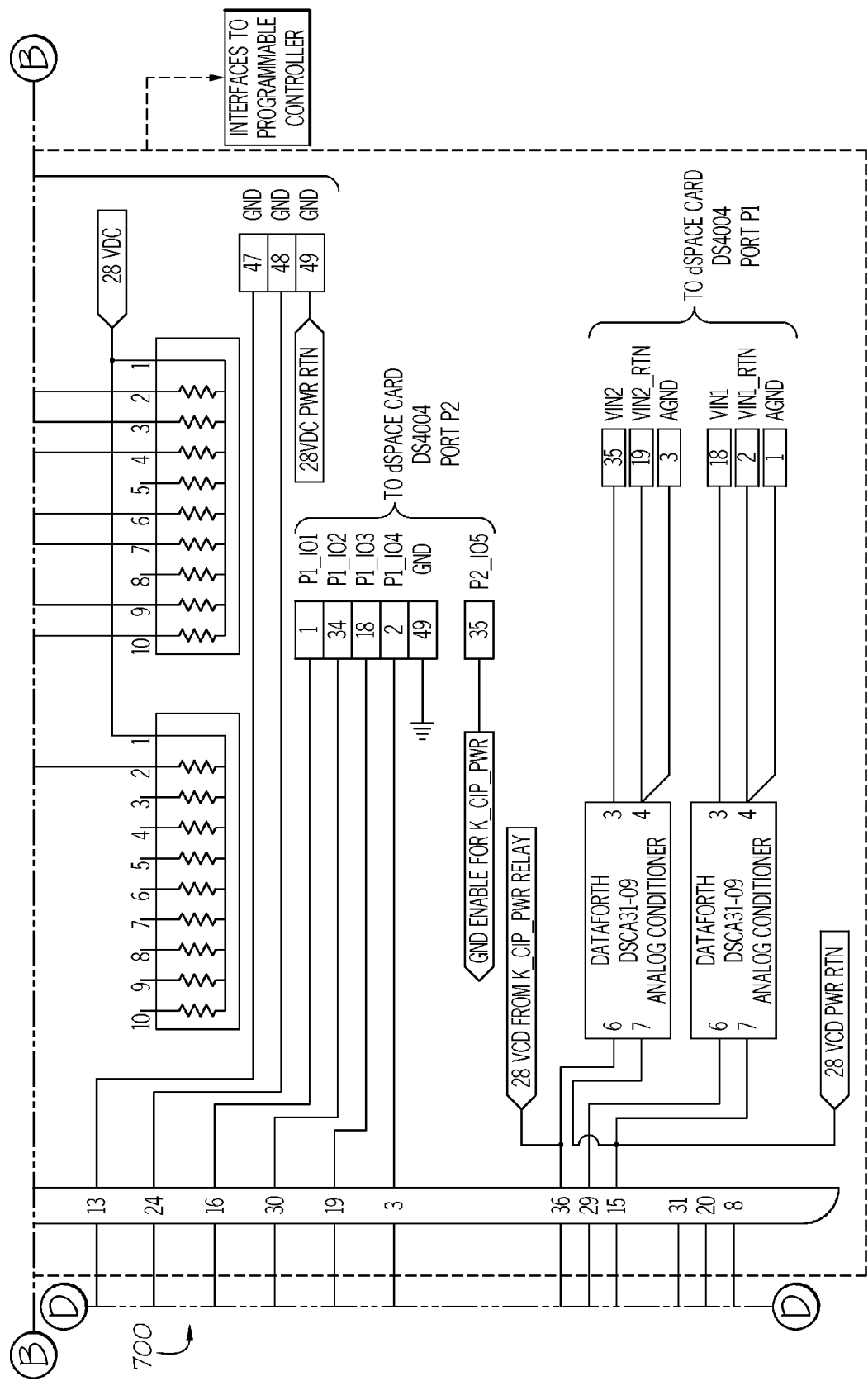

Pivot switch 260 may be used to perform a ground pivot or tight turn of the aircraft without a forward or reverse directional motion. Whereas in conventional taxi turning, aircraft nose wheels may turn up to 70 degrees in either direction, a tight turn process may employ wheels turned, for example, at or around 90 degrees and in caster mode. Pivot switch 260 may be situated beneath switch guard 265 (also shown in FIG. 6), one of safety mechanisms 122, to prevent inadvertent movement of the pivot switch 260 by the user. The switch guard 265 may be coupled to the top surface of the main body 210 via a hinge at one end, and released upwards by a user to expose pivot switch 260. Pivot switch 260 may default to a neutral position which sends a signal, such as a ground state to a digital input in the controller 140, to not allow a tight turn sequence. When pivot switch 260 is moved to the left or right turn position, a signal may be sent to allow the system to start a tight turn process if certain conditions are satisfied. These conditions may include a nose wheel in caster mode, aircraft speed of zero, and other required conditions as programmed in the controller 140. Controller 140 may be notified of these and other conditions via, for example, status inputs 145 (see FIG. 1). When pivot switch 260 is released by the user, it may return to the neutral position.

The aircraft may continue to turn as long as the pivot switch is held. An exit of the pivot mode may require a pivot input in the opposite direction, engaging the pivot exit logic of the controller 140. This is because, in order to change from pivot motion back to forward motion, the front wheel may need to be rotated from approximately 90 degrees back to within 60 degrees of normal centered position. Upon the pivot switch being moved to the opposite command direction, rather than initiating an opposite pivot, the system may stop driving one motor, leaving the other one to continue. This may pull the aircraft into an arc-shaped motion, pulling the front wheel back towards the normal operating position. Once the front wheel has rotated far enough to be engaged, the pivot-exit motion may be stopped and the system reset for forward motion.

Pilot interface panel 200 may include one or more response mechanisms 125 (see FIG. 1) to communicate various system statuses with the user. Response mechanisms 125 may include status lights 270 or other forms of communicating output signals. Response mechanisms 125 may receive status signals from controller 140, or from other control sources. For example, engage light 270a may be illuminated by a ground path when the clutch is in the engaged state. When the clutch is engaged and the motor control unit 150 is receiving command signals to provide torque to the wheel actuators, active light 270b may be illuminated. Available light 270c may be illuminated when criteria are met to satisfy a system available condition, and fault light 270d may be illuminated upon the occurrence of any critical faults, such as but not limited to system overheating or reverse motion without a prior stop.

Figure 2B:
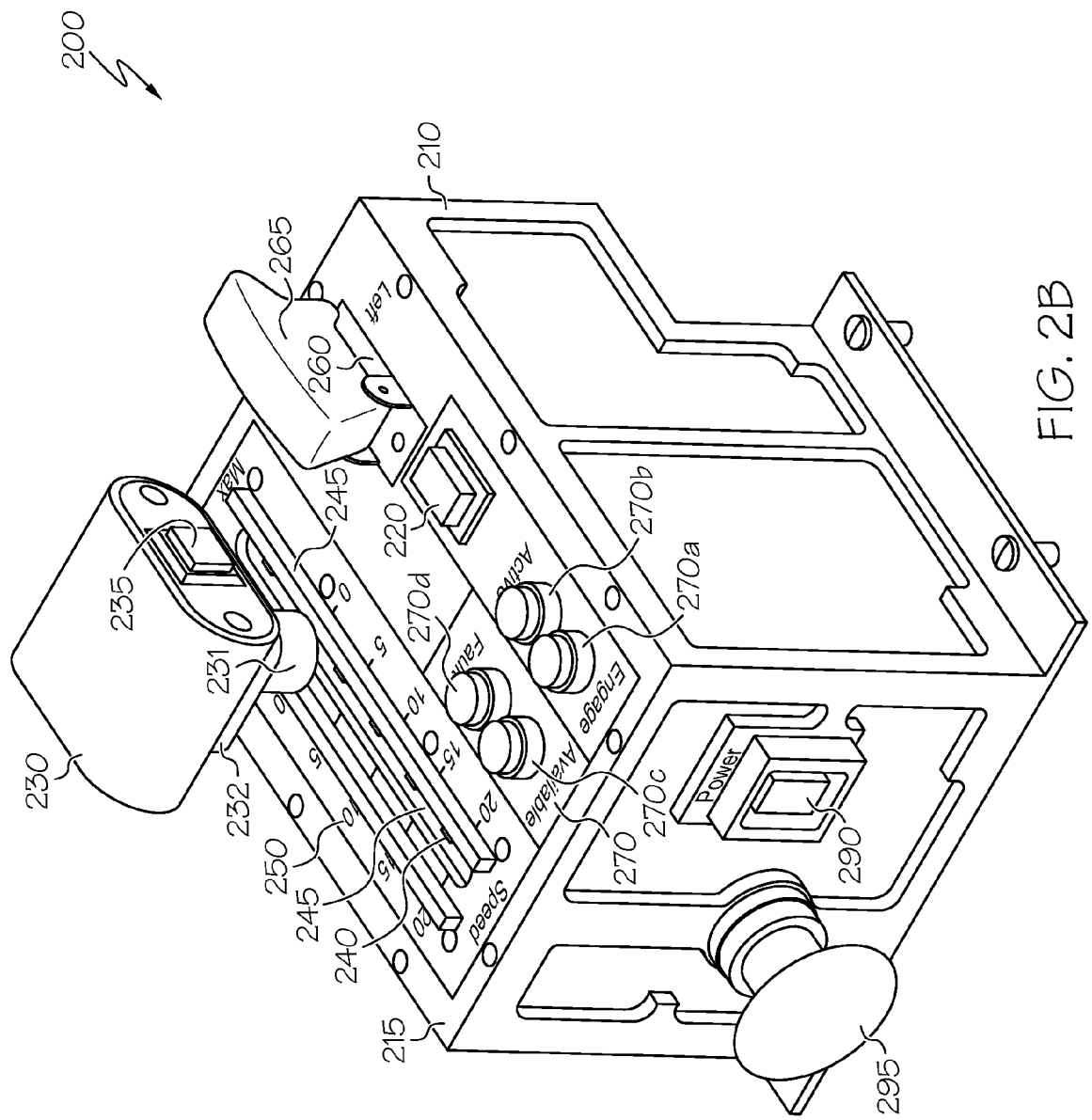
FIG. 2B illustrates an perspective rear view of the pilot interface panel of FIG. 2A.
Figure 2C:
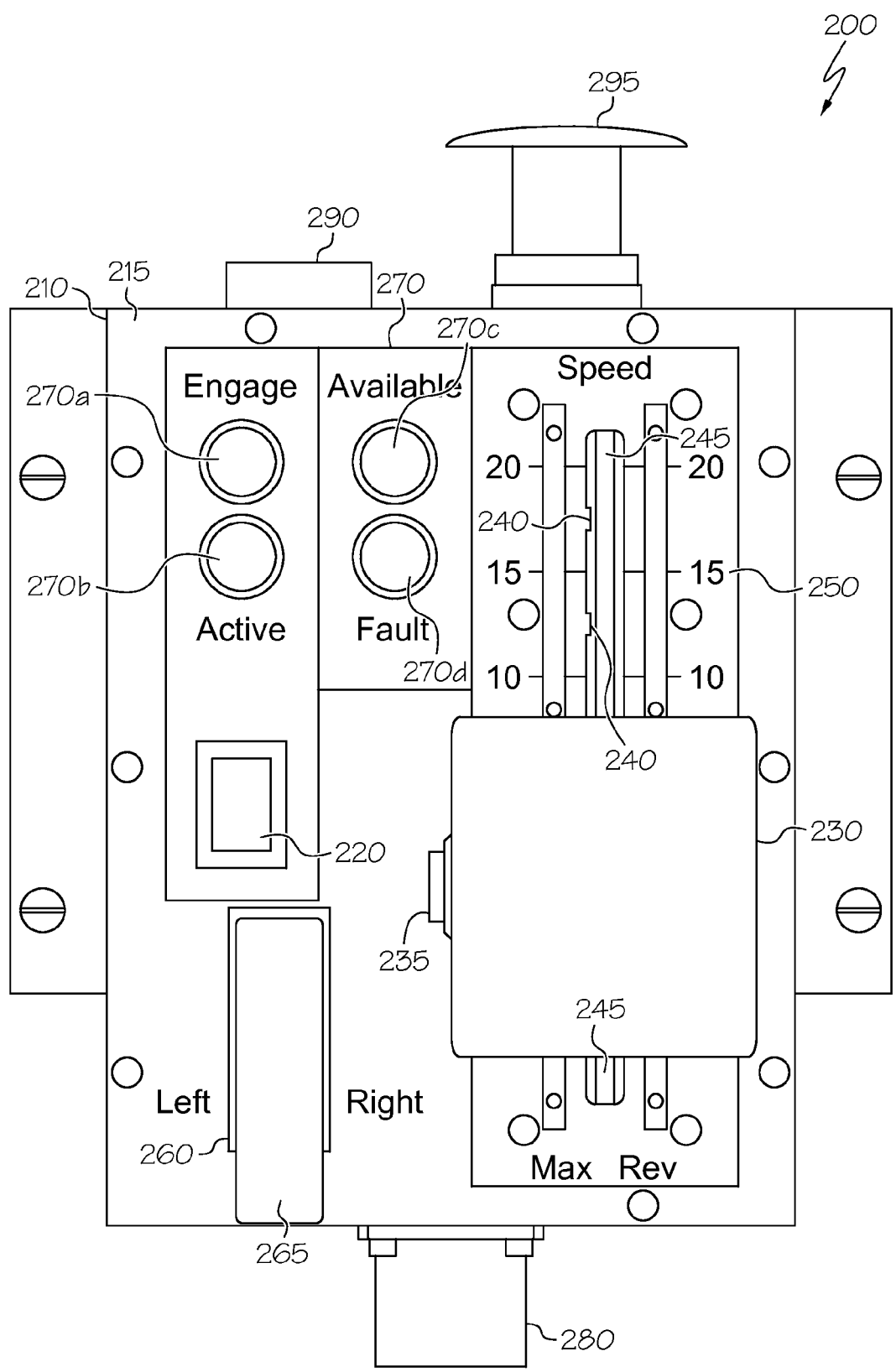
FIG. 2C illustrates a top view of the pilot interface panel of FIG. 2A.
Figure 3A:
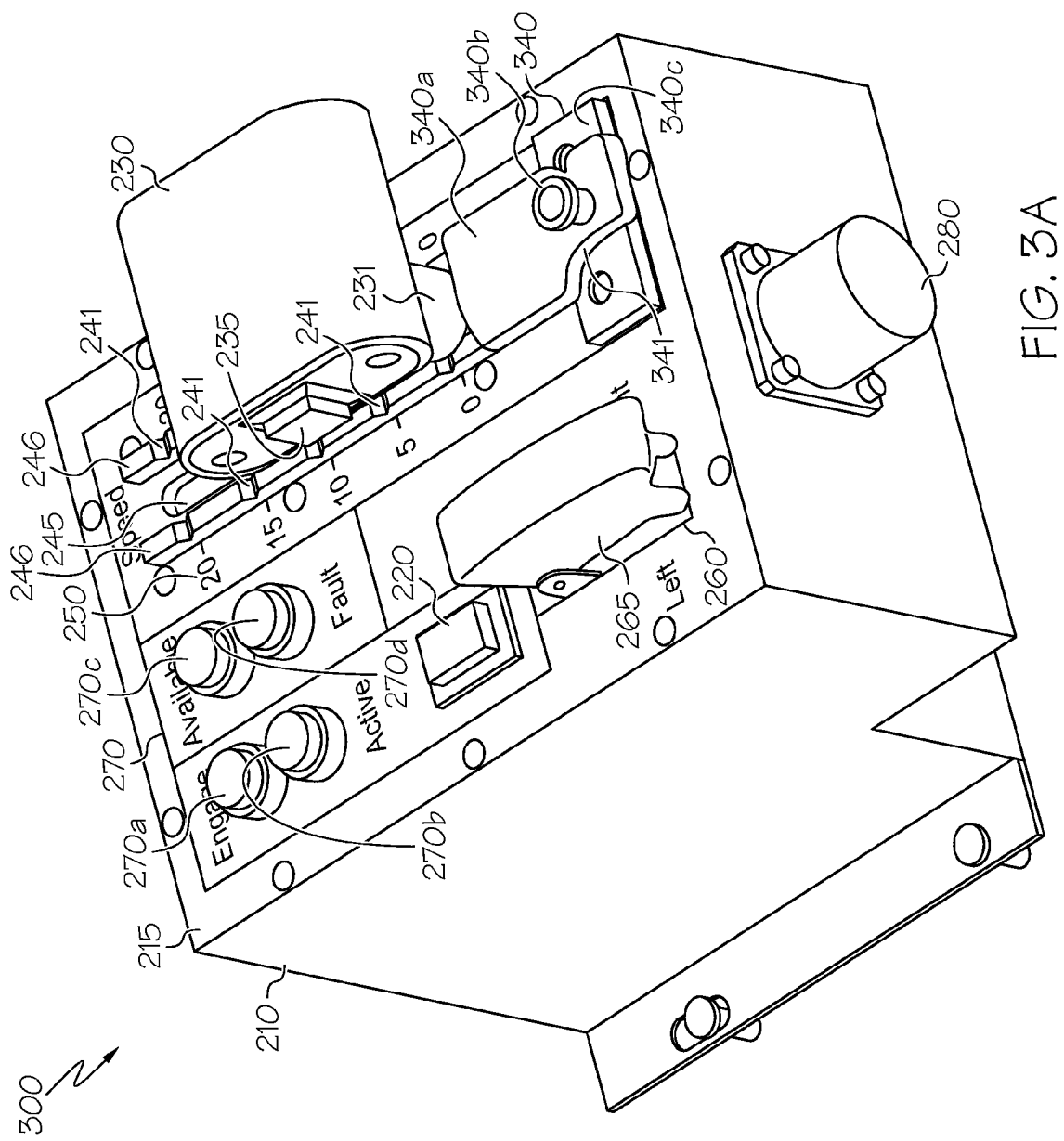
FIG. 3A illustrates a perspective front view of a pilot interface panel according to another exemplary embodiment of the present invention.
Figure 3B:
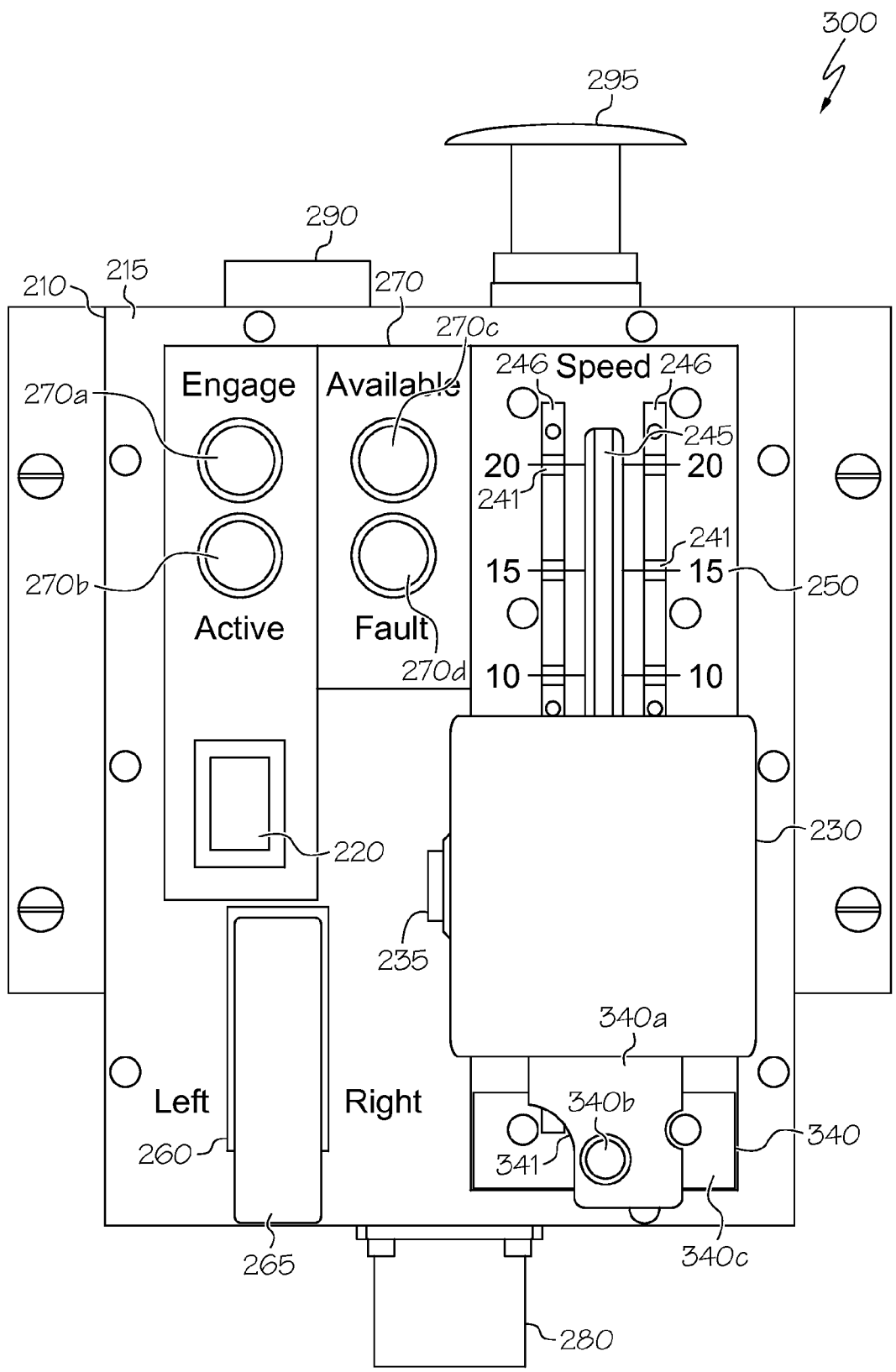
FIG. 3B illustrates a top view of the pilot interface panel of FIG. 3A.
Figure 3C:
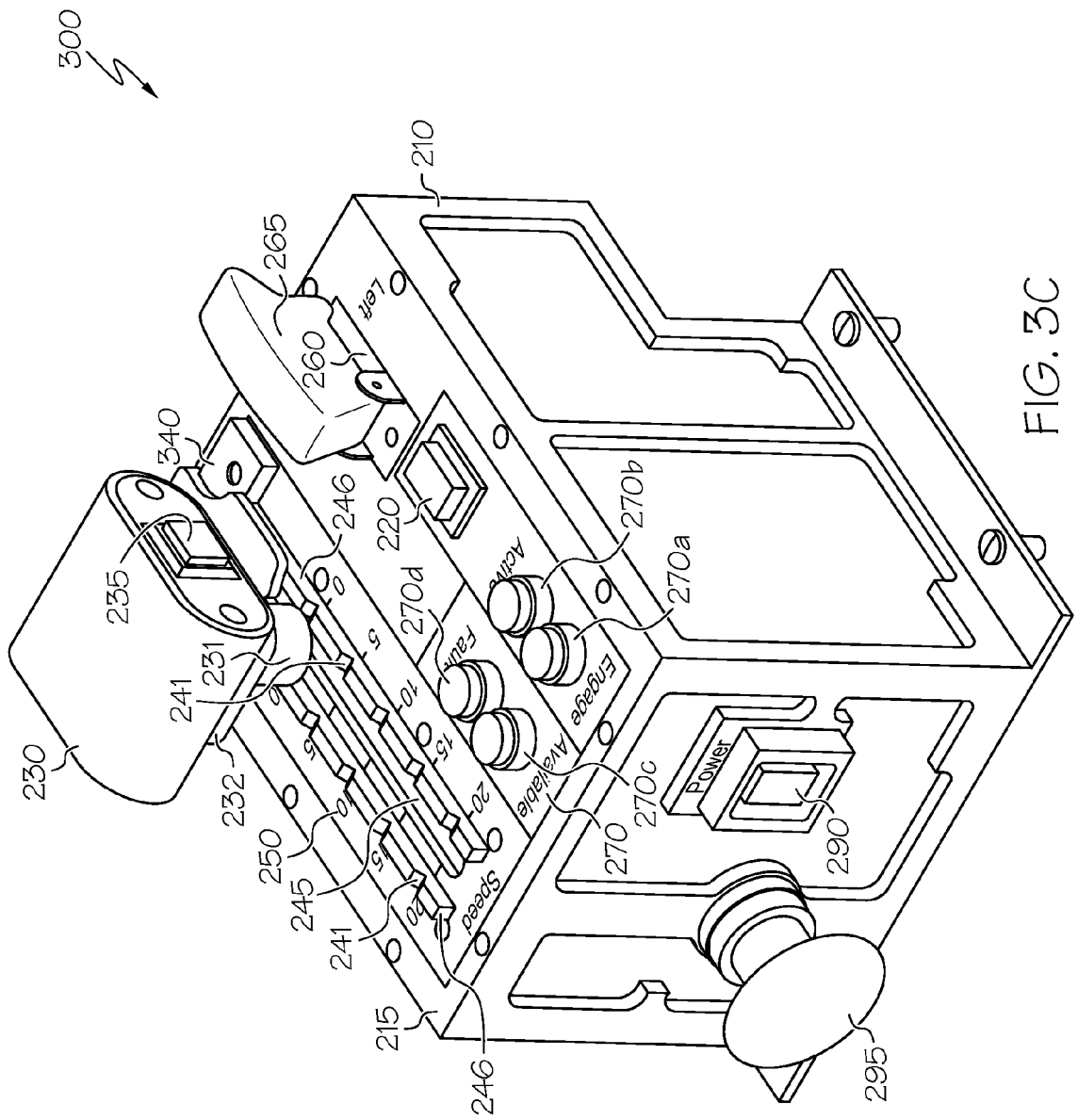
FIG. 3C illustrates an perspective rear view of the pilot interface panel of FIG. 3A.
Figure 3D:
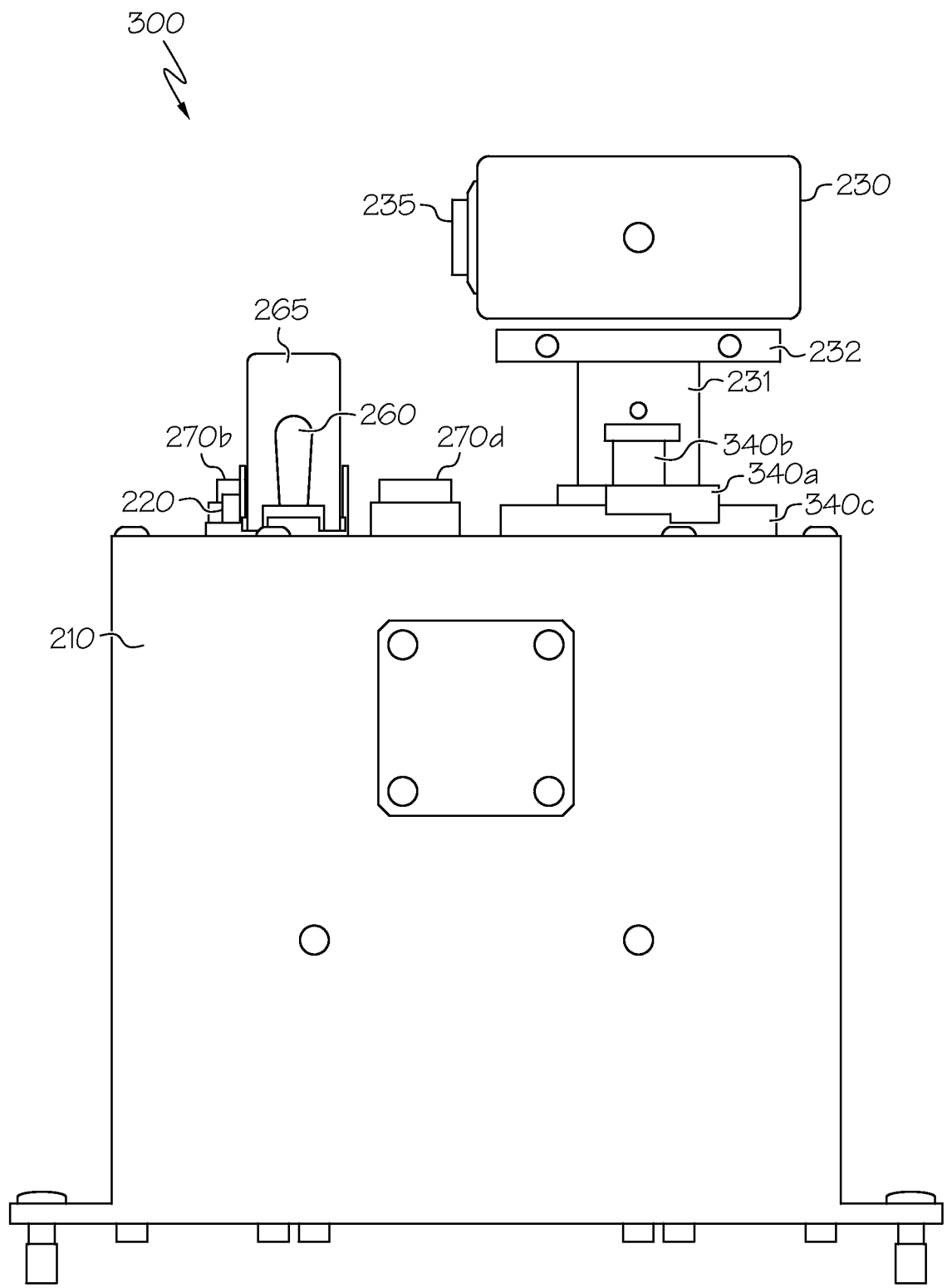
FIG. 3D illustrates a front view of the pilot interface panel of FIG. 3A.

As shown in FIGS. 2B-2C, pilot interface panel 200 may include a power switch 290. Power switch 290 may include a momentary switch that may be pressed to activate the pilot interface panel, providing an input signal to the controller 140's logic to allow it to accept further input signals as well as provide power to the pilot interface panel 200 itself. Upon the power button being pressed, all status lights 270 may illuminate briefly so as to indicate proper functioning of the lights.

An emergency stop 295 may be included in pilot interface panel 200. The emergency stop 295 may include a latching switch that provides a signal indicating either a non-emergency or emergency mode. For example, in one implementation, when the emergency stop 295 is pushed in the case of an emergency, it may latch into an open circuit configuration. If the output of the switch is an open circuit, the relay may not be energized and power may be removed from safety critical systems such as wheel actuator (or motor 160) control units and wheel actuators (or motors 160). When the emergency stop 295 is in the non-emergency, normal operating mode, the relay may be held in and power may be supplied to the wheel actuator control units.

In another exemplary embodiment of the invention, a pilot interface panel 300 shown in FIGS. 3A-3D may include the elements of pilot interface panel 200, as well as a reverse lockout 340 which may serve as an additional one of the safety mechanisms 122 to prevent the inadvertent movement of the speed control lever 230 into reverse mode. Reverse lockout 340 may optionally be configured to send a status signal to controller 140, indicating for example whether reverse lockout 340 is in an engaged or disengaged position.

As an example, reverse lockout 340 may include a lockout base 340c secured upon main body 210. Lockout pivot member 340a may be rotatably secured above lockout base 340c so that it may be disposed substantially perpendicularly to the base 340c and immediately adjacent to lever support 231, to form a "locked position," as shown in FIGS. 3A-3D and 5. In the locked position, lockout pivot member 340a may obstruct lever support 231 from moving downward past the "zero" speed position toward reverse mode.

Figure 4A:
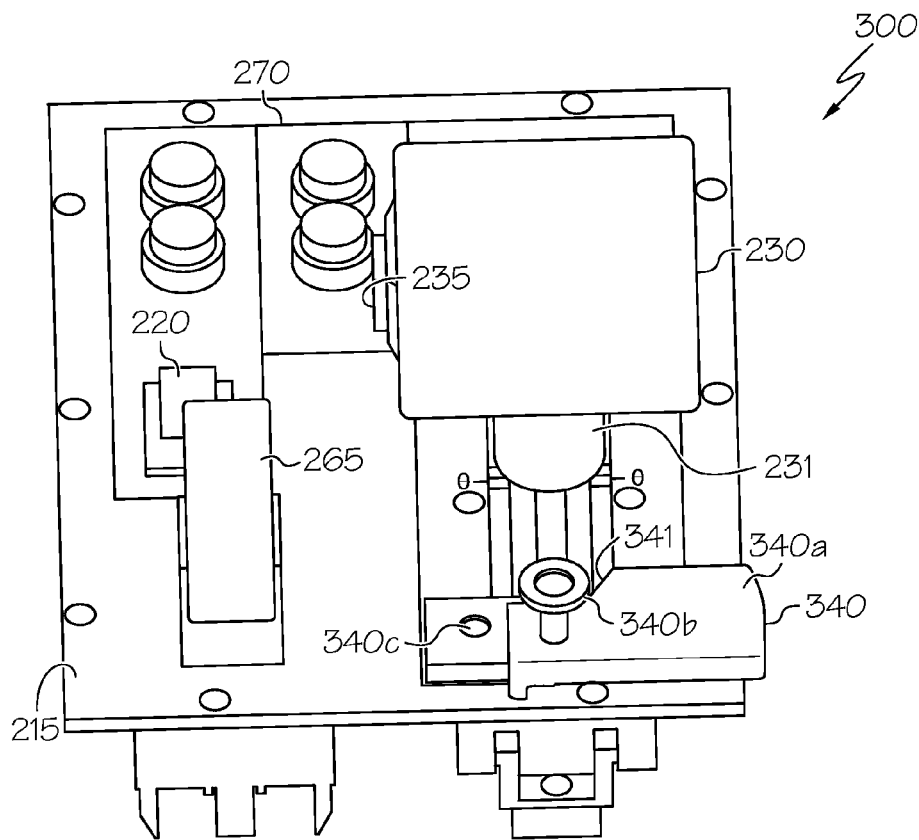
FIG. 4A illustrates a perspective top view of the pilot interface panel of FIG. 3A, with a reverse lockout member in an unlocked position.
Figure 4B:
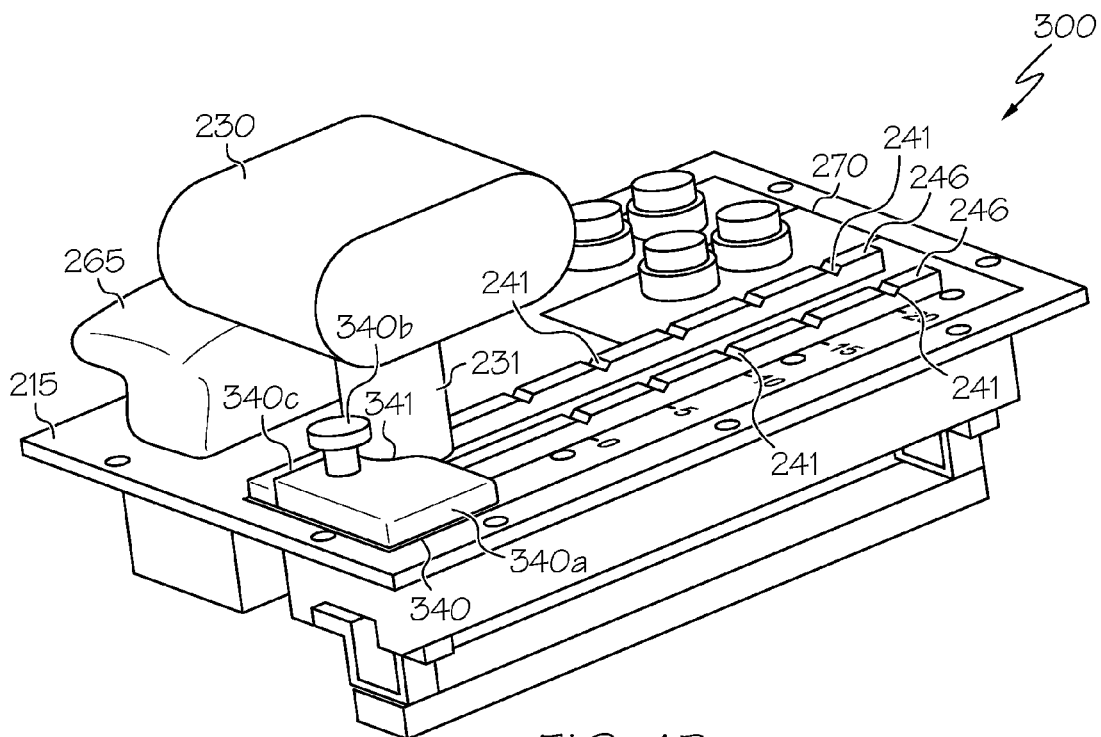
FIG. 4B illustrates a perspective side view of the pilot interface panel of FIG. 3A, with a reverse lockout member in an unlocked position.
Figure 5:
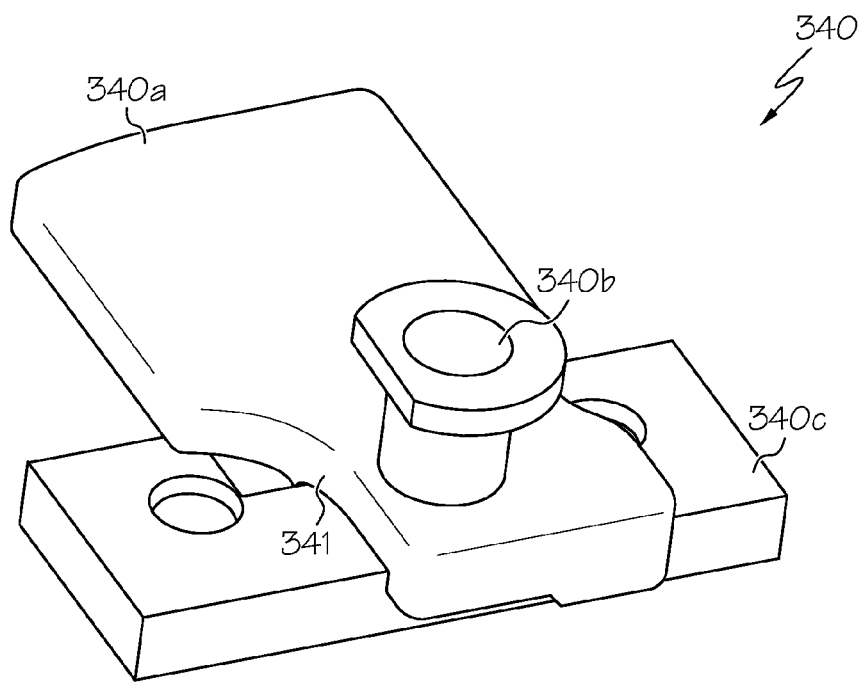
FIG. 5 illustrates a close-up view of a reverse lockout member of the pilot interface panel of FIG. 3A.

Lockout pivot member 340a may also be configured to rotate planar to the panel face 215 (for example, clockwise 90 degrees), to move from a locked position onto the lockout base 340c and into an "unlocked position," permitting downward movement of the speed control lever 230 past the "zero" speed position and into reverse mode, as shown in FIGS. 4A-4B. In the unlocked position, lever support 231, and thus speed control lever 230, may be free to move past the zero position into reverse mode. Thus, in this embodiment, a pilot may first rotate the lockout pivot member 340a to the unlocked position prior to moving the speed control lever 230 into reverse mode. The pilot may do so by gripping the lockout pivot handle 340b and using it to securely turn the lockout pivot member 340a. Lockout pivot member 340a may be formed with a cutout 341 in its corner or area adjacent to lever support 231, when the lockout pivot member 340a is in the unlocked position and lever support 231 is in the maximum reverse speed mode (at the bottom end of the lever channel 245).

Reverse lockout 340 may alternatively be implemented using one of various other means. One possible implementation may include use of a solenoid plunger (not shown) to prevent speed control lever 230 from being moved into reverse mode. The mechanism of the solenoid plunger may be correlated with the speed and/or direction at which the aircraft is currently moving. For example, the solenoid plunger may be configured so as to prevent speed control lever 230 from being moved into reverse mode while the aircraft is moving in a forward direction. The speed and/or direction of the aircraft may be provided by a ground speed input 145c (shown in FIG. 1 as one of status inputs 145) to controller 140. Ground speed input 145c may originate from motor control unit 150 or another component of the system.

FIGS. 7A-7D shows a wiring diagram 700 for an exemplary embodiment of a pilot interface panel. This diagram is provided for purposes of illustration and is not intended to limit the invention to any particular method of implementation. For example, wiring diagram 700 shows the use of potentiometers to control speed, although an alternative design may employ optical encoders and a digital interface.

Referring again to FIG. 1, the controller 140 may also receive one or more status inputs 145 independently of the pilot interface panel 200, on which the determination of various actions may be based. Status inputs 145 may include, but are not limited to, left and right brake statuses 145a and 145b. The controller 140 may receive a left brake input 145a and a right brake input 145b, subsequent to a speed input from the pilot interface panel 200, and may determine an action of canceling the speed input if the left brake input 145a is positive, the right brake input 145b is positive, or both left and right brake inputs 145a and 145b are positive (indicating that either or both brakes may be depressed). This implementation could be referred to as an "any-brake" configuration, where pressing any combination of brake pedals would cancel the current speed input in the system, thus disengaging the active speed setting. Once the brakes are released, the system may then reactivate and begin reaching the previously entered speed (i.e., the target speed it was either at or approaching before the brakes were applied).

Alternatively, in what may be referred to as a "half-brake" configuration, if the controller 140 receives only a left brake input 145a that is positive but a right brake input 145b that is negative (indicating that only the left brake is depressed)—or vice versa—the controller 140 may not determine an action of cancelling speed. In the half-brake configuration, the controller 140 may determine a speed cancellation only upon receipt of positive inputs from both brakes. This configuration allows for one of the brake pedals to be pressed without disengaging speed, thus allowing for differential braking and tight turning. The aircraft's type, size, weight, and other parameters may be used to select which brake logic (any-brake or half-brake) is implemented.

The half-brake configuration may thus allow pilots to maintain their taxi speed setting through turns, as long as they only use one brake at a time. When the pilot needs to slow their speed, they may press both brakes, which may cancel the current speed input until the aircraft has decelerated sufficiently. Again, once the brakes are released, the system may begin attaining the previously entered target speed. Alternatively with either brake logic, the controller 140 may be programmed so that once the brakes are released, the taxi system does not accelerate to reach the previous speed.

Figure 8:
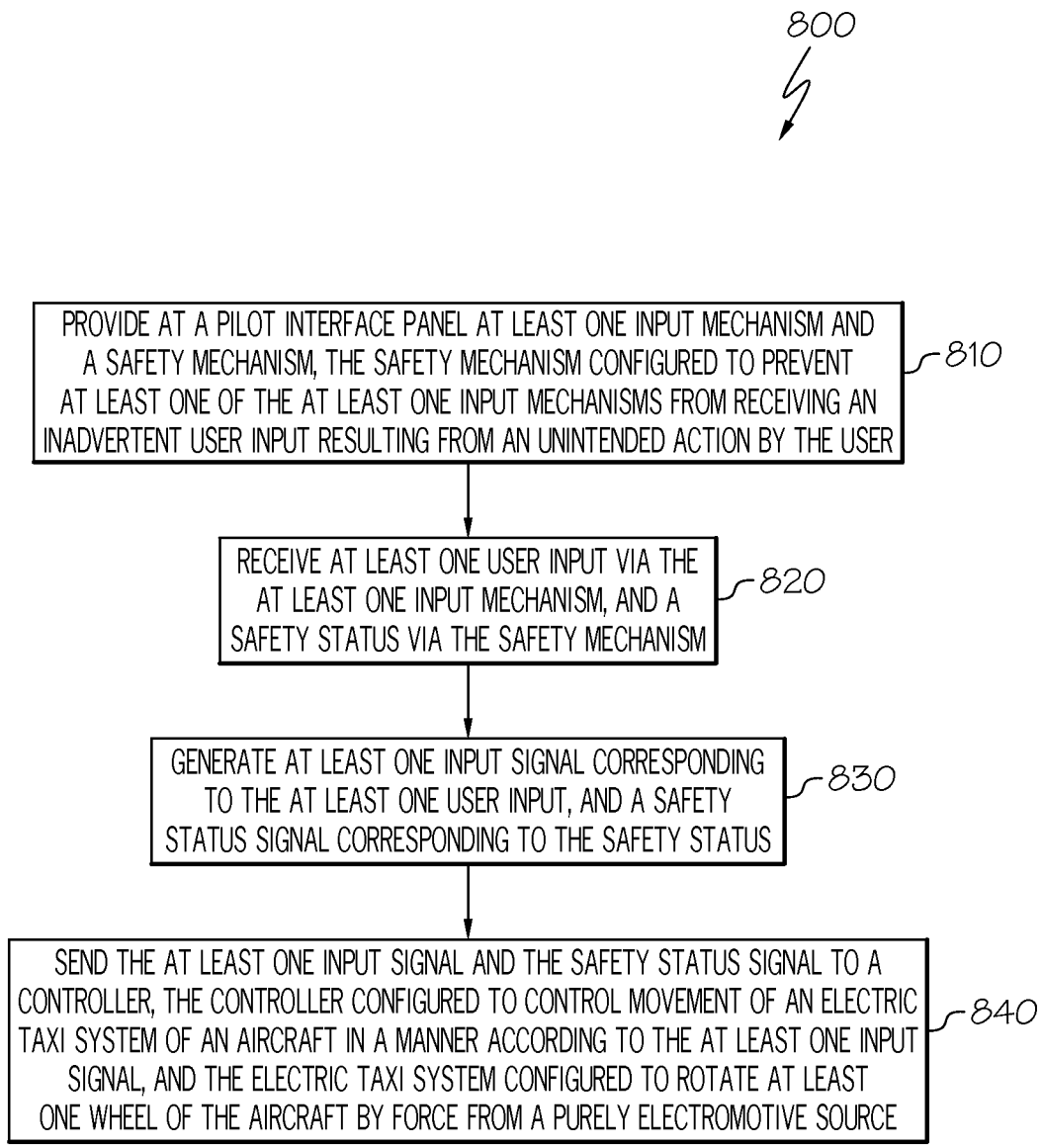
FIG. 8 illustrates an aircraft taxi interface method for controlling an electric taxi system of an aircraft, according to an exemplary embodiment of the present invention.

Referring now to FIG. 8, an aircraft taxi interface method 800 for controlling an electric taxi system of an aircraft is shown according to an exemplary embodiment of the present invention. In block 810, the pilot interface panel 200 may provide at least one input mechanism and a safety mechanism, wherein the safety mechanism may be configured to prevent at least one of the at least one input mechanisms from receiving an inadvertent user input resulting from an unintended action by the user. In block 820, the pilot interface panel 200 may receive at least one user input via the at least one input mechanism. It may also receive a safety status via the safety mechanism. In block 830, the pilot interface panel 200 may generate at least one input signal corresponding to the at least one user input. It may also generate a safety status signal corresponding to the safety status. In block 840, the pilot interface panel 200 may send the at least one input signal to the controller 140. It may also send the safety status signal to the controller 140. The controller 140 may be configured to control movement of an electric taxi system of an aircraft in a manner according to the at least one input signal, and the electric taxi system may be configured to rotate at least one wheel of the aircraft by force from a purely electromotive source.

It should be understood, of course, that the foregoing relates to exemplary embodiments of the invention and that modifications may be made without departing from the spirit and scope of the invention as set forth in the following claims.

What is claimed is:

1. A pilot interface panel, comprising:
   an input mechanism configured to:
      receive a user input through a control lever that can move along a longitudinal path,
      generate an input speed signal corresponding to the one user input, and
      send the input speed signal to a controller, the controller configured to control movement of an electric taxi system of an aircraft in a manner according to the input speed signal, and the electric taxi system configured to rotate a wheel of the aircraft by force from a purely electromotive source; and
   a safety mechanism configured to prevent the input mechanism from receiving an inadvertent user input resulting from an unintended action by the user, wherein the safety mechanism includes:
      a lever lock, on the control lever, which upon movement in a direction generally perpendicular to the longitudinal path, enables the control lever to move along the longitudinal path;
      a resume switch, on the control lever, which until activation, prevents the controller from responding to a new input speed signal.

2. The pilot interface panel of claim 1, wherein the input mechanism includes an engagement mechanism configured to receive an engagement input and generate a corresponding engagement input signal indicating a request to activate a clutch engagement sequence for the electric taxi system.

3. The pilot interface panel of claim 1, wherein the input mechanism includes a speed input mechanism configured to receive a speed input for a target taxi speed and generate a corresponding speed input signal indicating a request to reach the target taxi speed.

4. The pilot interface panel of claim 3, wherein the speed input mechanism includes a detent configured to provide resistance to movement of the control lever.

5. The pilot interface panel of claim 3, wherein the resume switch is configured to receive a resume input and generate a corresponding resume input signal indicating a request to resume the target taxi speed.

6. The pilot interface panel of claim 1, wherein the input mechanism includes a reverse input mechanism configured to receive a reverse input and generate a corresponding reverse input signal indicating a request to move the aircraft in a reverse motion.

7. The pilot interface panel of claim 6, the safety mechanism includes a reverse lockout member configured to prevent the reverse input mechanism from receiving an inadvertent user input resulting from an unintended action by the user, the reverse lockout member being maneuverable to allow the reverse input mechanism to receive a reverse input.

8. The pilot interface panel of claim 1, wherein the input mechanism includes a pivot input mechanism configured to receive a pivot input and generate a corresponding pivot input signal indicating a direction for pivoting the aircraft.

9. The pilot interface panel of claim 8, wherein the pivot input mechanism defaults to a neutral position and generates a signal indicating no pivot of the aircraft desired.

10. The pilot interface panel of claim 8, the safety mechanism includes a switch guard configured to prevent the pivot input mechanism from receiving an inadvertent user input resulting from an unintended action by the user.

11. The pilot interface panel of claim 1, further comprising a plurality of response mechanisms configured to communicate system states to the user.

12. An aircraft taxi interface system, comprising:
    a pilot interface panel configured to:
       receive user input via a pivot switch,
       generate an input wheel pivot signal corresponding to the user input, and
       provide a safety mechanism configured to prevent the input mechanism from receiving an inadvertent user input resulting from an unintended action by the user, wherein the safety mechanism includes:
       a safety guard hinged at one end and rotatable at the hinged end to expose the pivot switch;
       wherein the pivot switch is configured to:
          default to a neutral position that prevents a pivot turn of a wheel of the aircraft;
          send, when the pivot switch is out of the neutral position, a signal to a controller to start a turn process if certain conditions are satisfied;
          wherein the conditions include at least one of the wheel being in a caster mode and a speed of the aircraft is zero; and
    the controller being in communication with the pilot interface panel and a motor control unit, the motor control unit configured to control a motor of an electric taxi system of an aircraft, the electric taxi system configured to rotate a wheel of the aircraft by force from a purely electromotive source, the controller being operable to:
       receive the input wheel pivot signal from the pilot interface panel,
       determine an action for the electric taxi system based on the input wheel pivot signal,
       generate a command corresponding to the action, and
       send the command to the motor control unit, wherein the motor control unit initiates the action in the electric taxi system.

13. The aircraft taxi interface system of claim 12, wherein the user input includes a target velocity, and the action includes one of accelerating or decelerating the aircraft to reach the target velocity.

14. The aircraft taxi interface system of claim 12, wherein the user input includes a target velocity and a resume input, and the action includes one of accelerating or decelerating the aircraft to reach the target velocity of movement when the resume input is positive.

15. The aircraft taxi interface system of claim 12, wherein the controller is further operable to receive a set of status inputs, the user input includes a first pivot input indicating a first direction, and the action includes rotating the aircraft via the electric taxi system.

16. The aircraft taxi interface system of claim 15, wherein the user input further includes a second pivot input indicating a second direction opposite the first direction, and the action includes interrupting a motion of a first motor of the electric taxi system and allowing a continued motion of a second motor of the electric taxi system.

17. The aircraft taxi interface system of claim 12, wherein the controller is further operable to receive a left brake input and a right brake input, the user input includes a speed input, and the action includes canceling the speed input if the left brake input is positive, the right brake input is positive, or both left and right brake inputs are positive.

18. The aircraft taxi interface system of claim 12, wherein the controller is further operable to receive a left brake input and a right brake input, the user input includes a speed input, and the action includes canceling the speed input only if both left and right brake inputs are positive.

19. An aircraft taxi interface method for controlling an electric taxi system of an aircraft, the method comprising:

providing at a pilot interface panel an input control lever and a safety mechanism;
wherein the control lever is enabled to move along a longitudinal path;
wherein the safety mechanism configured to prevent the input mechanism from receiving an inadvertent user input, of reverse aircraft direction mode, resulting from an unintended action by the user;
wherein the safety mechanism is a reverse lockout that includes a lockout base and, pivotally connected thereto, a lockout pivot member whereby the pivot member may rotate between a locked position and an unlocked position, whereby a locked position prevents movement of the control lever along the longitudinal path and into a reverse aircraft direction mode;
receiving a user input via the input mechanism;
generating an input signal corresponding to the user input; and
sending the input signal to a controller, the controller configured to control movement of an electric taxi system of an aircraft in a manner according to the input signal, and the electric taxi system configured to rotate a wheel of the aircraft by force from a purely electromotive source.

20. The aircraft taxi interface method of claim 19, further comprising:

receiving a safety status via the safety mechanism;
generating a safety status signal corresponding to the safety status; and
sending the safety status signal to the controller.

\* \* \* \* \*